United States Patent
Ide et al.

(10) Patent No.: US 8,632,695 B2
(45) Date of Patent: Jan. 21, 2014

(54) NEGATIVE ELECTRODE ACTIVE MATERIAL FOR NONAQUEOUS SECONDARY BATTERY

(75) Inventors: Hitohiko Ide, Saitama (JP); Daisuke Inoue, Saitama (JP); Yanko Marinov Todorov, Saitama (JP); Natsumi Shibamura, Saitama (JP); Yasunori Tabira, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 13/581,804

(22) PCT Filed: Mar. 8, 2011

(86) PCT No.: PCT/JP2011/055393
§ 371 (c)(1),
(2), (4) Date: Aug. 30, 2012

(87) PCT Pub. No.: WO2011/111709
PCT Pub. Date: Sep. 15, 2011

(65) Prior Publication Data
US 2012/0319038 A1    Dec. 20, 2012

(30) Foreign Application Priority Data
Mar. 9, 2010    (JP) ................................. 2010-052423

(51) Int. Cl.
*H01B 1/04*    (2006.01)
*H01M 4/38*    (2006.01)

(52) U.S. Cl.
USPC .................... 252/182.1; 252/518.1; 252/500; 252/521.3

(58) Field of Classification Search
USPC ......................... 252/500, 182.1, 518.1, 521.3
See application file for complete search history.

(56) References Cited

U.S. PATENT DOCUMENTS

| 7,160,646 | B2 | 1/2007 | Ohshita et al. |
| 2002/0146623 | A1 | 10/2002 | Suzuki et al. |
| 2009/0087731 | A1 | 4/2009 | Fukui et al. |

FOREIGN PATENT DOCUMENTS

| CN | 1476645 | 2/2004 |
| JP | 2000-149951 | 8/2000 |
| JP | 2003-208893 | 7/2003 |
| JP | 2004-047182 | 2/2004 |
| JP | 2005-011650 | 1/2005 |
| JP | 2009-32644 | 2/2009 |
| JP | 2009-099523 | 5/2009 |

OTHER PUBLICATIONS

International Search Report—PCT/JP2011/055393—Jun. 21, 2011.
Japanese Official Action—2011-527530—Oct. 4, 2011.

*Primary Examiner* — Mark Kopec
*Assistant Examiner* — Katie L Hammer
(74) *Attorney, Agent, or Firm* — Young & Thompson

(57) ABSTRACT

A negative electrode active material for nonaqueous secondary batteries containing a silicon solid solution. The silicon solid solution has one or more than one of a group 3 semimetal or metal element, a group 4 semimetal or metal element except silicon, and a group 5 nonmetal or semimetal element incorporated in silicon. The solid solution shows an XRD pattern in which the position of the XRD peak of the solid solution corresponding to the XRD peak position assigned to the (422) plane of silicon shifts to the smaller or greater angle side relative to the position of the XRD peak assigned to the (422) plane of silicon peak by 0.1° to 1°. The solid solution has a lattice strain of 0.01% to 1% as determined by XRD.

13 Claims, 10 Drawing Sheets

NEGATIVE ELECTRODE ACTIVE MATERIAL FOR NONAQUEOUS SECONDARY BATTERY

TECHNICAL FIELD

This invention relates to an active material for use in the negative electrode of nonaqueous secondary batteries, such as lithium secondary batteries. It also relates to a negative electrode containing the active material for a nonaqueous secondary battery and a nonaqueous secondary battery having the negative electrode.

BACKGROUND ART

A carbonaceous material has been normally used as a negative electrode active material of nonaqueous secondary batteries. However, a carbonaceous material has difficulty on account of its low theoretical discharge capacity in dealing with the increase of power consumption of small-sized electric/electronic equipment and the use in an on-board battery. Silicon-containing materials having a higher capacity than carbonaceous materials have been studied as a negative electrode active material taking the place of the carbonaceous materials. For example, patent literature 1 below proposes using a boron-containing silicon material as a negative electrode active material. According to the disclosure, mixing a silicon material powder having a suitable particle size with a low concentration of boron and heating the mixture under a certain condition provides a boron-containing silicon material powder having a considerably smaller amount of silicon boride ($SiB_4$) than thermodynamically estimated from the boron content and assuming a substantially supercooled state. Using such a boron-containing silicon material powder is described as providing markedly reduced capacity loss and improved cycle characteristics while retaining the large discharge capacity inherently possessed by silicon.

Another negative electrode active material containing silicon and boron is known from patent literature 2 below. According to the disclosure, the intended active material is obtained by introducing a molten alloy containing silicon and boron into a swirling water flow either directly or after being atomized by gas into droplets thereby to rapidly cool the molten alloy. FIG. 3 of patent literature 2 shows a cooling velocity in the order of $10^5$K/second.

CITATION LIST

Patent Literature

Patent literature 1: US 2002/0146623A1
Patent literature 2: JP 2004-47182A

SUMMARY OF INVENTION

Technical Problem

Use of the boron-containing silicon material powder described in patent literatures 1 and 2 is still insufficient to improve charge/discharge cycle characteristics and charge/discharge rate characteristics of batteries.

Accordingly, an object of the invention is to provide a negative electrode active material which eliminates various disadvantages of the aforementioned prior art techniques.

Solution to Problem

The invention provides a negative electrode active material for nonaqueous secondary batteries. The active material contains a silicon solid solution. The silicon solid solution contains silicon and one or more than one of a group 3 semimetal or metal element, a group 4 semimetal or metal element except silicon, or a group 5 nonmetal or semimetal element. The solid solution shows an XRD pattern in which the position of the XRD peak of the solid solution corresponding to the XRD peak assigned to the (422) plane of silicon shifts to the smaller or greater angle side relative to the position of the XRD peak assigned to the (422) plane of silicon by 0.1° to 1°. The solid solution has a lattice strain of 0.01% to 1% as determined by XRD.

Advantageous Effects of Invention

The invention achieves the following effects: relaxation of volumetric expansion and contraction of a negative electrode active material caused by lithium ion absorption and release during charge and discharge; improvement on battery charge/discharge cycle characteristics; improvement on electron conductivity of a negative electrode active material, which leads to improved charge/discharge rate characteristics; increase in reversibility in the initial charge/discharge cycle; and improvement in oxidation resistance of a negative electrode active material.

DESCRIPTION OF EMBODIMENTS

Figure 1:
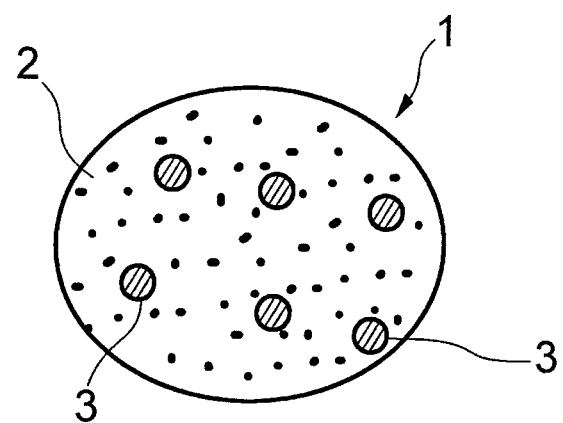
FIG. 1 is a schematic illustration of a composite of a silicon solid solution and a silicon alloy that can be used in the invention.

The present invention will be described with reference to its preferred embodiments. The negative electrode active material according to the invention is for use in nonaqueous secondary batteries, including lithium secondary batteries. The negative electrode active material is characterized by having a silicon solid solution as a matrix. The silicon solid solution has a group 3 semimetal or metal element, a group 4 semimetal or metal element except silicon, or a group 5 nonmetal or semimetal element incorporated as a solute. The elements mentioned will be referred to as a solute element. Examples of the solute element include boron as a group 3 semimetal element, germanium as a group 4 semimetal element, tin as a group 4 metal element, nitrogen and phosphorus as a group 5 nonmetal element, and arsenic, antimony, and bismuth as a group 5 semimetal element. Preferred of them are boron (group 3 semimetal element), germanium (group 4 semimetal element), and phosphorus (group 5 nonmetal element). These solute elements may be used either individually or in combination of one or more thereof. When two or more solute elements are used in combination, they are desirably of the same group.

The negative electrode active material of the invention having the solute element incorporated into silicon shows reduced expansion and contraction when lithium ions are absorbed and released during charge and discharge. As a result, the negative electrode active material is effectively prevented from deterioration after repetition of charge/discharge cycles, which leads to improved battery charge/discharge cycle characteristics. The negative electrode active material of the invention exhibits good electron conductivity to improve charge/discharge rate characteristics and increased reversibility in the initial charge/discharge. Furthermore, the negative electrode active material of the invention exhibits increased oxidation resistance. The increased oxidation resistance of a negative electrode active material is advantageous in effectively preventing deterioration of a battery stored in a high temperature environment and preventing reduction of discharge capacity of a battery being repeatedly charged and discharged in a high temperature environment. As used herein, the term "high temperature" is intended to indicate a temperature in the range of from 45° to 80° C. as is generally recognized in the art.

In particular, the negative electrode active material of the invention which has boron as a solute element is advantageous in that the side reaction involved in a negative electrode during charge and discharge, such as electrolyte decomposition, is suppressed compared with pure silicon or other silicon alloys used as a negative electrode active material, in addition to the above described effects on charge/discharge cycle characteristics and rate characteristics. Occurrence of a by-product causes not only expansion of the electrode but also other inconveniences, such as consumption of lithium active in the electrode reaction. While the mechanism about reduction of a by-product in the active material having boron as a solute and silicon as a solvent has not yet been identified, the inventors make the following assumption: introduction of boron in silicon is considered to cause introduction of many positive holes in the solid solution. Because the main side reaction of the electrolyte on a negative electrode is an electrophilic reaction, it is believed that the existence of many positive holes in the negative electrode active material reduces the side reaction.

It should be noted that the above discussed silicon solid solution is clearly distinguished from silicon alloys. The silicon solid solution shows diffraction peaks corresponding to those of silicon in XRD. In contrast, a silicon alloy shows diffraction peaks specific to the silicon alloy with no peaks assigned to silicon. Although the silicon solid solution preferably consists of itself, it is allowed to contain an alloy or intermetallic compound between silicon and the solute element in a small proportion that does not impair the effects of the invention.

While, as noted above, the silicon solid solution shows a diffraction peak in XRD corresponding to an XRD peak of silicon as a matrix element, the position of the peak of the silicon solid solution is shifted from the position of the peak of silicon to the smaller or greater angle side. The shift of the peak position is caused by a change in crystal lattice. The inventors' investigation has revealed that the amount of the shift of the peak position is influential on the characteristics of the negative electrode active material. In detail, it is necessary that the solid solution show a diffraction pattern in which the position of the peak of the solid solution corresponding to the peak assigned to the (422) plane of silicon having a diamond structure shifts to the smaller or greater angle side relative to the position of the peak assigned to the (422) plane of silicon by 0.1° to 1°. When the shift is within that range, the following effects are produced by a nonaqueous secondary battery having a negative electrode active material containing the silicon solid solution: good charge/discharge cycle characteristics and rate characteristics; increased reversibility in the initial charge/discharge; and increased oxidation resistance. To further ensure these effects, the amount of the peak position shift is preferably from 0.1° to 0.8°, more preferably 0.2° to 0.8°, even more preferably 0.4° to 0.7°.

Whether the peak position shifts to the lower angle side or the higher angle side depends on the lattice constant of the silicon solid solution. When the lattice constant of the silicon solid solution is larger than that of silicon, the position of a peak of the silicon solid solution shifts to the smaller angle side relative to the position of the corresponding peak of silicon. Conversely, when the lattice constant of the silicon solid solution is smaller than that of silicon, the peak position of the silicon solid solution shifts to the greater angle side relative to the corresponding peak position of silicon. The direction of the peak position shift is not critical in the invention. The amount of the shift is influential on the effects of the invention.

The reason why the position of the diffraction peak assigned to the (422) plane of silicon is used as a benchmark for the amount of peak position shift is based on a rule of thumb discovered by the present inventors to the effect that good reproducibility of the peak position shift is obtained. Therefore, to use the diffraction peak assigned to the (422) plane of silicon as a benchmark for the amount of shift is not essential to the invention.

In determining the position of the diffraction peak assigned to the (422) plane of silicon and the amount of peak position shift, CuKα radiation is used as an X ray source, and the diffraction peaks obtained are separated into those of CuKα$_1$ radiation and those of CuKα$_2$ radiation. The analysis is then made on the diffraction peaks by CuKα$_1$ radiation.

The negative electrode active material of the invention is also characterized in that the silicon solid solution discussed above has a lattice strain. The lattice strain is caused by site-to-site variation of the lattice constant of crystallites constituting the silicon solid solution. Although it is possible to obtain a silicon solid solution with no lattice strain depending on the process of preparation, the inventors' study has proved that a negative electrode active material containing such a silicon solid solution is unable to produce the effects of the invention. In order to obtain the various effects discussed above, it is necessary to use a silicon solid solution having a lattice strain.

Whether a silicon solid solution has a lattice strain is qualitatively determined by the width of an XRD peak. If a diffraction peak of a silicon solid solution has approximately the same width as the corresponding peak of silicon, the silicon solid solution is deemed to have no lattice strain. If, on the other hand, a diffraction peak of a silicon solid solution has a broader width than the corresponding peak of silicon, the silicon solid solution is judged to have a lattice strain.

To quantitatively determine a lattice strain, the Hall method represented by (1) below, which is well known in the field of X-ray crystallography, is used advantageously (see Hall, W. H., J. Inst. Met., 75, 1127 (1950); idem, Proc. Phys. Soc., A62, 741 (1949)).

[Math. 1]

$$\beta \cos\theta/\lambda = 2\eta(\sin\theta/\lambda) + (1/\epsilon) \quad (1)$$

wherein $\eta$ is a lattice strain (dimensionless number); $\beta$ is diffraction-line broadening (in radians) due to crystallite sizes; $\lambda$ is the wavelength (angstrom) of measuring X-ray; $\theta$ is the Bragg angle (in radians) of a diffraction line; and $\epsilon$ is a constant.

The silicon solid solution of the invention has a lattice strain of 0.01% to 1%, preferably 0.2% to 0.8%, more preferably 0.3% to 0.8%, even more preferably 0.4% to 0.8%, as calculated according to (1). With the lattice strain of the silicon solid solution falling within the above ranges, the following effects are produced by a nonaqueous secondary battery having a negative electrode active material containing the silicon solid solution: good charge/discharge cycle characteristics, good charge/discharge rate characteristics, and increased reversibility in the initial charge/discharge. While $\eta$ in (1) is a dimensionless number, the term "lattice strain" as used herein denotes a value in percent obtained by multiplying $\eta$ by 100.

In the invention, the lattice strain of a silicon solid solution is determined by the following method. CuK$\alpha$ is used as an X-ray source. Diffraction peaks of the silicon solid solution are determined by powder XRD. The integral breadth of all the diffraction peaks appearing at or below the diffraction angle (2$\theta$) of 120° is measured. The above described Hall method is applied to the measured value to calculate the lattice strain. LaB$_6$, the standard reference material for X-ray diffractometry, is used to estimate an instrumental function in calculating the integral breadth. The diffraction peaks appearing at or below 120° (diffraction angle) typically include those assigned to the (111), (220), (311), (400), (331), (422), (333), (440), and (531) planes.

The lattice strain of the silicon solid solution may disappear by annealing the silicon solid solution. However, even after annealing, the solid solution structure is not lost, and no precipitation of a silicon alloy phase is observed, either. Thus, the silicon solid solution of the invention is regarded totally unknown and extremely unique.

The amount of the solute element in the silicon solid solution is preferably 0.01 to 10 at %, more preferably 1 to 6 at %, even more preferably 1 to 3 at %, relative to silicon atom. With the solute element content falling in that range, the charge/discharge cycle characteristics, charge/discharge rate characteristics, reversibility of the initial charge/discharge cycle, and the like improve further. The solute element content may be determined by, for example, ICP.

The negative electrode active material of the invention may consist solely of the above described silicon solid solution or may comprise a composite of the silicon solid solution and a silicon alloy. As schematically illustrated in FIG. 1, the composite 1 has a silicon solid solution as a matrix 2 and a silicon alloy phase 3 precipitated over the matrix 2. Accordingly, a mere mixture of a silicon solid solution and a silicon alloy is not included under the term "composite" as referred to herein. A negative electrode active material made of such a silicon solid solution/silicon alloy composite has an advantage of higher electroconductivity as compared with a negative electrode active material made solely of the silicon solid solution. When, in particular, the silicon alloy phase 3 is precipitated in the grain boundaries of the silicon solid solution, the above noted various advantageous effects will become more pronounced. Whether or not a silicon alloy phase is precipitated in the silicon solid solution matrix is decided through XRD of the composite or by analyzing the elemental distribution in a small area of a cut section of the negative electrode active material using an energy dispersive X-ray spectroscopy (EDX). In the cases where a silicon alloy phase is precipitated, a diffraction peak of the silicon alloy phase will appear overlapping the diffraction peak of the silicon solid solution.

Examples of the silicon alloy include an alloy of silicon with a transition metal, such as iron, nickel, titanium, cobalt, or copper. An alloy of silicon and niobium is also useful. It is particularly preferred to use a metal M which is selected in such a manner that, at the eutectic point of the silicon alloy, the metal M has a ratio that satisfies from 1 to 50 at % in the composition of the silicon alloy. The ratio is defined by [the number of metal M atoms/(the number of Si atoms+the number of metal M atoms)×100]. Examples of such a metal M include iron (ratio at the eutectic point: 26.5 at %), nickel (ratio at the eutectic point: 42 at %), titanium (ratio at the eutectic point: 16 at %), niobium (ratio at the eutectic point: 2 at %); and cobalt (ratio at the eutectic point: 22.5 at %). The proportion of the transition metal in the composite is preferably 0.001 to 10 at %, more preferably 0.001 to 5 at %, even more preferably 0.01 to 3 at %, based on the number of Si atoms in the composite.

A silicon solid solution having a lattice strain is prepared by various methods. A particulate silicon solid solution is conveniently prepared by, for example, what we call a "steam explosion atomization method", also called CANOPUS (cooling and atomizing based on noble process utilizing steam explosion) method. The steam explosion atomization method is known, the details of which are given, e.g., in WO 01/081032, WO 01/081033, and Central Research Institute of Electric Power Industry, Report No. T01024 (April, 2002). The steam explosion atomization method will only be outlined briefly. A molten mixture of silicon and a solute element and, if needed, an element alloying with silicon is provided. The molten mixture is introduced into a liquid coolant, whereupon a vapor film covering the molten mixture is formed in the coolant. The vapor film is collapsed or ruptured to bring the molten mixture and the coolant into direct contact to cause boiling as a result of spontaneous nucleation. The pressure wave resulting from the boiling is made use of in rending and atomizing the molten mixture while cooling and solidifying the molten mixture.

Figure 2:
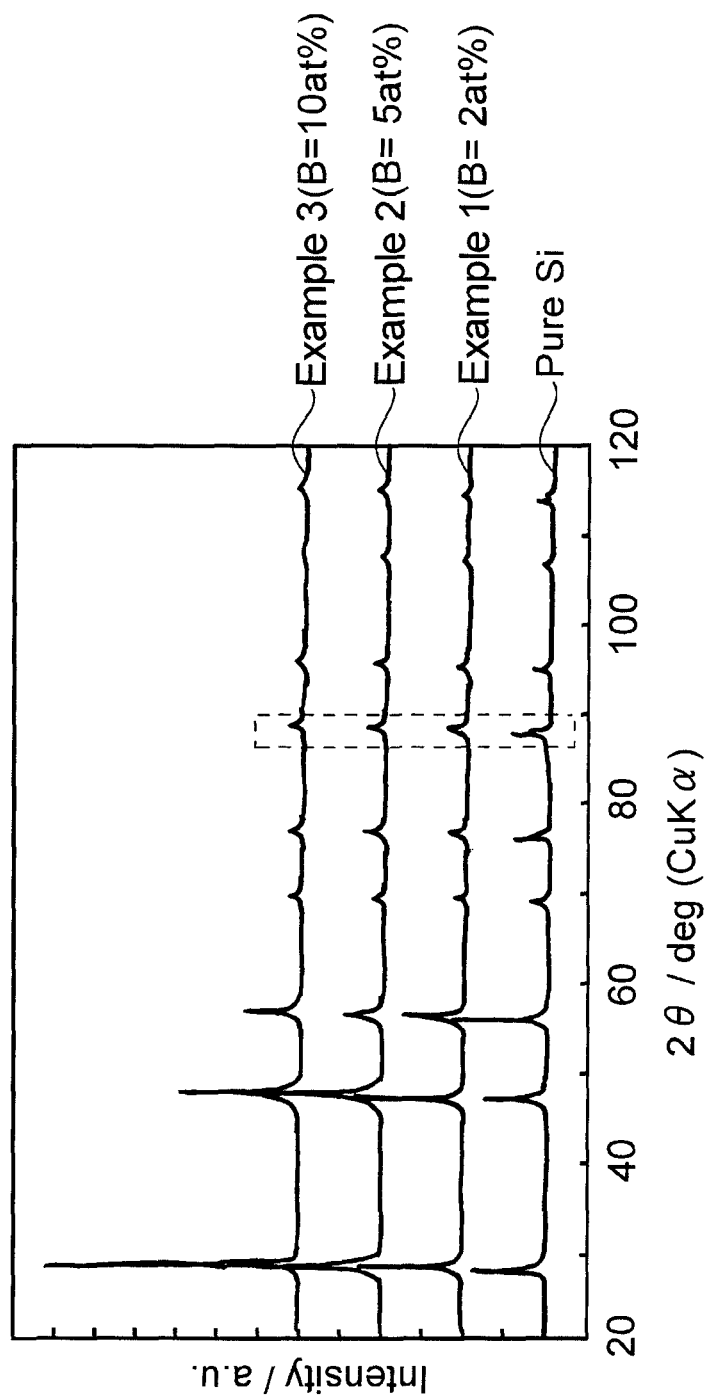
FIG. 2 presents an XRD pattern of the silicon solid solutions obtained in Examples 1 to 3 and of pure silicon.
Figure 3:
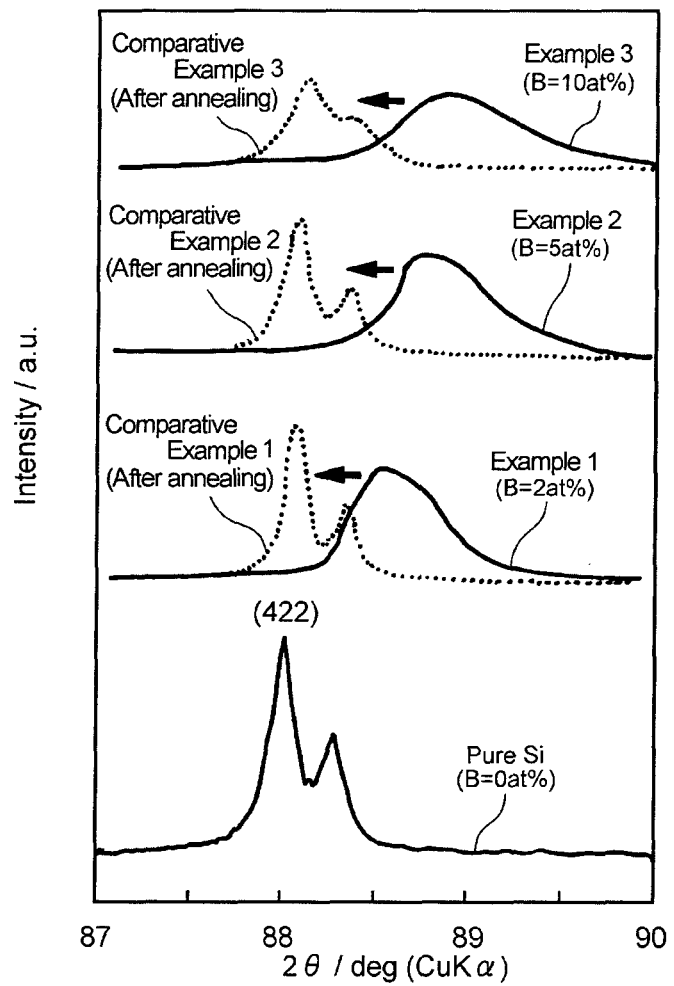
FIG. 3 presents an enlarged part of each XRD pattern shown in FIG. 2 in the range of 2θ=87° to 90°.

Apparatus that can be used to carry out the steam explosion atomization method include the one illustrated in FIGS. 2 and 3 of WO 01/081032 and FIGS. 2 and 3 of WO 01/081033. This apparatus includes a crucible containing the molten mixture. The crucible has at its bottom an openable and closable outlet through which the molten mixture is allowed to fall in drops. Below the outlet is provided a mixing nozzle for mixing the drops of the molten mixture and a coolant. The mixing nozzle may be a cylinder so that the drops of the molten mixture may fall in the cylinder. The cylinder is provided on its inner wall guide wire in a helical form so that the coolant may swirl downward along the guide wire. The purpose of swirling the coolant downward is to minimize the difference in falling speed between the molten mixture drops and the coolant and to lengthen the retention time in the cylinder. By this manipulation, the contact time between the molten mixture and the coolant is lengthened to secure the time required for cooling the molten mixture to induce the vapor film collapse and the subsequent boiling due to spontaneous nucleation. The inner diameter of the cylindrical mixing nozzle is sufficiently larger than the diameter of the molten mixture drops and yet sufficiently small for forming a gentle swirling flow. For example, the inner diameter is at least about 2 to 8 mm and not more than about 25 mm.

The molten mixture in the crucible is kept heated at temperatures such that, when it comes into direct contact with the coolant, the temperature of the interface between the molten mixture and the coolant is the spontaneous nucleation temperature or higher, preferably sufficiently higher than the spontaneous nucleation temperature. The temperature of the molten mixture is not higher than the temperature at which the vapor film collapses, for example, on contact with the coolant, namely not higher than the minimum film boiling temperature. The minimum film boiling temperature is decided by the temperatures of the molten mixture and the coolant with no external force applied.

The coolant may be any liquid that is able to boil through spontaneous nucleation on contact with the molten mixture. Preferred examples of such a liquid include water, liquid nitrogen, an organic solvent, such as methanol or ethanol, and so on. Water that is superior in economy and safety is generally used.

The drops of the molten mixture from the crucible collide with the coolant in the mixing nozzle and disperse in the coolant on collision impact. Because of the high temperature of the molten mixture, the coolant around the individual drops boils to form a vapor film, and the drops assume a premixed state in which the individual drops are covered with the vapor film.

Upon local collapse or rupture of the vapor film of any dispersed drop (particle), a pressure wave is generated there and propagates to other particles to cause boiling following spontaneous nucleation in waves. Since fragmentation of the molten mixture into fine particles increases the specific surface area and the cooling rate, there will exist a positive feedback such that vaporization of the coolant increases to produce more pressure waves. As a result, the fragmentation is promoted and, at the same time, cooling is effected rapidly. The molten mixture is thus fragmented efficiently without leaving coarse lumps.

A vapor film forms around the molten mixture as a result of vaporization of the coolant on receipt of the heat transferred from the molten mixture. The vapor film stabilizes when the heat budget between vaporization which progresses with the heat from the molten mixture and cooling by the coolant is balanced. Meanwhile, as the temperature of the molten mixture decreases, the heat budget is disrupted to cause condensation, that is, vapor film collapse occurs. The condensation takes place on the entire surface of the particle almost at one time, so that the molten mixture comes into contact with the coolant on its entire surface at one time, and the interfacial temperature between the molten mixture and the coolant rises to or above the spontaneous nucleation temperature. As a result, the coolant around the molten mixture particle, i.e., the lower temperature side boils due to spontaneous nucleation. Boiling due to spontaneous nucleation results in rapid evaporation, and vapor bubbles expand rapidly to generate a high-pressure wave. The pressure wave propagates at an extremely high velocity and acts on the whole of individual molten mixture particles uniformly. The molten mixture particles are thus fragmented as if they are torn apart by the pressure wave. At the same time, since the molten mixture increases in specific surface area as a result of fragmentation, the cooling rate further increases. This increases evaporation of the coolant, which is followed by vapor film formation, vapor film collapse, and boiling due to spontaneous nucleation, thereby generating more pressure waves.

Since the molten mixture is fragmented into fine particles by utilizing the pressure waves generated by bubbles of several nanometers in size generated by spontaneous nucleation, it is easy to obtain fine particles ranging in size from submicrometer order to 100 micrometer order. It is possible to produce microfine particles of several micrometers that have not been obtained by conventional methods or apparatus for producing fine particles, especially particles of about 3 μm that have not been achieved by any conventional method. The yield is high because the whole drop of the molten mixture undergoes fragmentation all at once, leaving no large lumps. In addition, the particle size distribution is focused on a narrow range, so that fine particles of desirable sizes can be obtained in a large proportion. In that case, an improved fragmentation efficiency (fragmentation ratio) per unit mass will be achieved. Furthermore, the specific surface area increases with the progress of fragmentation, thereby increasing the cooling rate.

The above discussed steam explosion atomization method is carried out, for example, under the following condition. A molten mixture is dropped in several gram portions, and the coolant is fed at such a rate that the amount thereof swirling in the mixing nozzle is approximately 100 ml.

A desired negative electrode active material is obtained through the above described operation. When the molten mixture is composed solely of silicon and a solute element, a silicon solid solution having the solute element incorporated in a silicon is obtained. This silicon solid solution has a lattice strain. When in using a molten mixture composed of silicon, a solute element, and an element alloying with silicon, there is obtained a composite having a silicon alloy phase precipitated in a silicon solid solution having the solute element incorporated in a silicon. The silicon solid solution in the composite has a lattice strain. The molten mixture to be used is designed to have the same composition as a desired silicon solid solution or composite thereof.

The negative electrode active material as obtained by the steam explosion atomization method has a particulate form. The particle size is preferably 2 to 10 μm, more preferably 2 to 3 μm, in terms of $D_{50}$ measured by a laser diffraction scattering method. The particles as obtained by steam explosion atomization method may be pulverized by a dry and/or wet method to obtain a particle size suitable for use as a negative electrode active material or may be classified to have a controlled size distribution.

In the case where a negative electrode active material of thin film form containing a silicon solid solution with a lattice strain is desired, the thin film may be formed by making aerosol of the active material strike against a current collector substrate (e.g., copper foil) at a near-sonic velocity as in a gas deposition method.

The negative electrode active material containing Si and B of patent literature 2 described in Background Art is also produced by rapidly cooling a molten material similarly to the negative electrode active material of the invention. It should be understood, nevertheless, that the negative electrode active material of the invention is obtained through the process including feeding a molten material into a liquid coolant, forming a vapor film covering the molten material in the coolant, collapsing the vapor film to bring the molten material and the coolant into direct contact to cause spontaneous nucleation followed by boiling to generate a pressure wave, and rending and fragmenting the molten material by the pressure waves into microfine particles while cooling and solidifying the molten material. In contrast, the technique of patent literature 2 does not involve such vapor film formation and collapse. The cooling rate of the molten material reached in the steam explosion atomization method employed in the invention is preferably $10^6$ to $10^8$ K/s, more preferably $10^7$ to $10^8$ K/s, which is one or more digit higher than that attainable by the method described in patent literature 2. According to the technique of patent literature 2, fragmentation of the molten material precedes rapid cooling. These differences make the negative electrode active material of the invention structurally different from that of patent literature 2.

The cooling rate may be estimated as follows. Powder of $Al_{89}Si_{11}$, a standard reference material for cooling rate estimation, is prepared by the method of the invention. The dendrite arm spacing in the central portion of an $Al_{89}Si_{11}$ powder particle is observed and determined. The cooling rate is estimated based on this dendrite arm spacing according to a known correlation formula.

When using a particulate negative electrode active material, the active material is mixed with a binder, an electroconductive material, and a solvent to prepare an electrode mixture in a usual manner. The mixture is applied to a current collector made of, e.g., Cu to form a negative electrode active material layer. If desired, the active material layer may be pressed after drying. The active material layer may be subjected to electroplating or electroless plating as immersed in a plating bath with the plating bath penetrating between particles of the negative electrode active material. In that case, a plating metal deposits in the active material layer to form a continuous three-dimensional network structure throughout the active material layer. The particles of the negative electrode active material are covered with the deposited metal on at least a part of the surface thereof and held in the three dimensional network structure of the deposited metal. Throughout the active material layer, there is formed a three dimensional network structure of voids through which a nonaqueous electrolyte is allowed to pass. A metal that does not form a compound with lithium during charging is used advantageously as a plating metal. Examples of such a metal are Cu, Ni, Fe, and Co. Details of a negative electrode using a negative electrode active material having such a structure are described, e.g., in WO 08/001,540.

The negative electrode thus prepared is combined with a positive electrode, a separator, a nonaqueous electrolyte, and so on to complete a nonaqueous secondary battery. The positive electrode is composed of, for example, a current collector and a positive electrode active material layer formed on at least one side of the current collector. The positive electrode active material layer contains an active material. Any active materials known in the art for use in the positive electrode may be used, such as lithium-transition metal complex oxides, including $LiCoO_2$, $LiNiO_2$, $LiMnO_2$, $LiMn_2O_4$, $LiCo_{1/3}Ni_{1/3}Mn_{1/3}O_2$, $LiCO_{0.5}Ni_{0.5}O_2$, $LiNi_{0.7}Co_{0.2}Mn_{0.1}O_2$, $Li(Li_xMn_{2x}Co_{1-3x})O_2$ (where $0<x<1/3$), $LiFePO_4$, and $LiMn_{1-z}M_zPO_4$ (where $0<z\leq0.1$, and M is at least one metal element selected from the group consisting of Co, Ni, Fe, Mg, Zn, and Cu).

Exemplary and preferred separators to be used with the negative and the positive electrode are nonwoven fabric of synthetic resins and porous film of polyolefins, such as polyethylene and polypropylene, or polytetrafluoroethylene.

The nonaqueous electrolyte is a solution of a lithium salt, a supporting electrolyte, in an organic solvent. Examples of suitable organic solvents include ethylene carbonate, propylene carbonate, dimethyl carbonate, methylethyl carbonate, diethyl carbonate, and mixtures of two or more of them. Examples of the lithium salt include $CF_3SO_3Li$, $(CF_3SO_2)NLi$, $(C_2F_5SO_2)_2NLi$, $LiClO_4$, $LiAlCl_4$, $LiBF_4$, $LiPF_6$, $LiAsF_6$, $LiSbF_6$, $LiCl$, $LiBr$, $LiI$, and $LiC_4F_9SO_3$. These lithium salts may be used individually or as a combination of two or more thereof.

EXAMPLES

The invention will now be illustrated in greater detail by way of Examples. It should be noted, however, that the invention is not construed as being limited thereto.

Examples 1 to 3

A silicon solid solution having boron as a solute was prepared by the steam explosion atomization method using the apparatus shown in FIG. 2 of WO 01/081033. The boron content in the solid solution was as shown in Table 1. In the apparatus shown, the cylindrical mixing nozzle 2 had an inner diameter of 2.0 mm. The amount of the coolant swirling in the mixing nozzle was 100 L/min. Room temperature water was used as a coolant. A molten mixture of silicon and boron was kept heated at 1600° C. and allowed to fall dropwise (in free fall) in 13 g portions into the mixing nozzle 2. The cooling rate at this time was estimated to be $10^6$ to $10^8$ K/s in accordance with the above described method of estimation. An XRD pattern (ray source: CuKα) of the resulting negative electrode active material (silicon solid solution) is shown in FIG. 2. An XRD pattern of pure silicon is also shown in FIG. 2. FIG. 3 shows an enlarged part of each XRD pattern shown in FIG. 2 in the range of 2θ=87° to 90°. In the obtained silicon solid solution, the amount of the shift of the position of the XRD peak was obtained from the XRD patterns. The amount of the shift of the position of the XRD peak was obtained by subtracting the position of the XRD peak assigned to the (422) plane of silicon having a diamond structure from the position of the XRD peak of the silicon solid solution corresponding to the XRD peak assigned to the (422) plane of silicon having a diamond structure. The results are shown in Table 1. The lattice strain of the silicon solid solution was obtained by the Hall method based on the XRD patterns. The lattice strain was calculated using the nine peaks of the (111), (220), (311), (400), (331), (422), (333), (440), and (531) planes. The results obtained are also shown in Table 1. The particle size $D_{50}$ of the silicon solid solution determined by laser diffraction scattering is also shown in Table 1. The average particle size $D_{50}$ was determined using a laser diffraction scattering particle size analyzer Microtrack (Model No. 9320-X100) from Nikkiso Co., Ltd.

Comparative Examples 1 to 3

Each of the particulate silicon solid solutions prepared in Examples 1 to 3 was annealed at 1000° C. in a nitrogen atmosphere for 24 hours to alleviate the lattice strain of the particles thereby to provide a negative electrode active material. An enlarged XRD pattern of the resulting negative electrode active material in the range of 2θ=87° to 90° is shown in FIG. 3. As is apparent from FIG. 3, the peak assigned to the (422) plane is still observed even after annealing, indicating that the solid solution state remains. Note that the position of the peak shifted to the higher angle size. It is also seen that the annealing makes the peak assigned to the (422) plane sharper, indicating alleviation of the lattice strain. The amount of the shift of the position of the XRD peak of the negative electrode active material after annealing corresponding to the peak assigned to the (422) plane of silicon from the position of the latter peak is shown in Table 1. The lattice strain of the negative electrode active material after annealing as calculated by the Hall method is also shown in Table 1.

Example 4

Figure 4A:
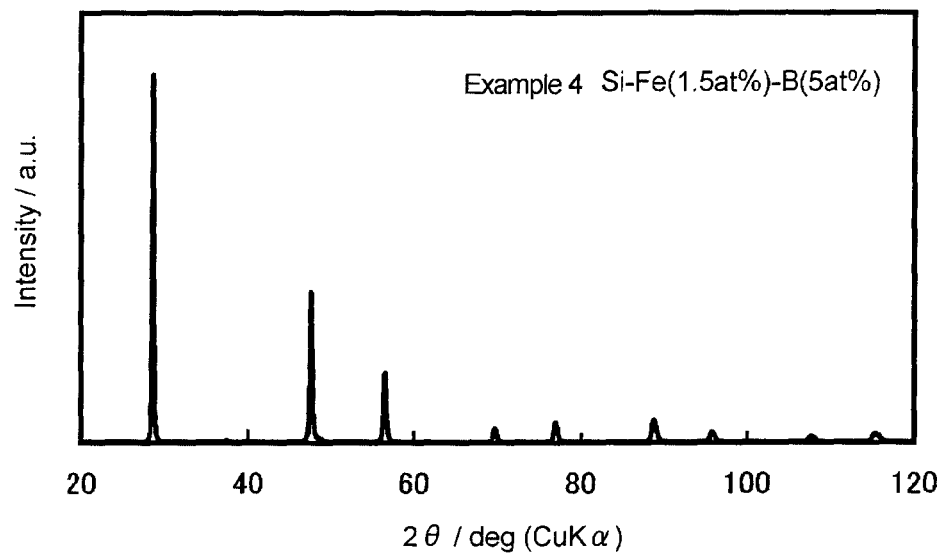
FIG. 4(a) is an XRD pattern of the silicon solid solution obtained in Example 4.
Figure 4B:
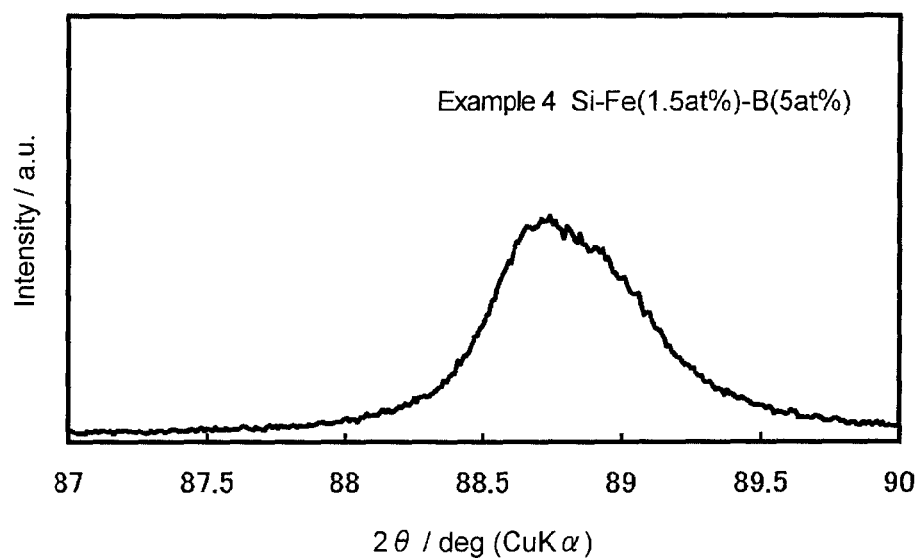
FIG. 4(b) is an enlarged part of the XRD pattern shown in FIG. 4(a) in the range of 2θ=87° to 90°.

A negative electrode active material was obtained in the same manner as in Examples 1 to 3, except for changing the composition as shown in Table 1. The resulting negative electrode active material was identified to be a composite composed of a matrix that was a silicon solid solution having boron as a solute and a silicon-iron alloy precipitated in the matrix. A cut section of the active material particle was analyzed by small-area EDX to determine the elemental distribution. As a result, silicon and iron were detected at the same position, which provides confirmation on the precipitation of a silicon-iron alloy. An XRD pattern of the composite is shown in FIG. 4(a). An enlarged part of the XRD pattern of FIG. 4(a) in the range of 2θ=87° to 90° is shown in FIG. 4(b). The shift of the position of the XRD peak of the composite which corresponds to the peak assigned to the (422) plane of silicon from the position of the latter peak is shown in Table 1. The lattice strain of the composite as obtained by the Hall method is also shown in Table 1.

Examples 5 and 6

A negative electrode active material composed of an Si—Ge solid solution was obtained in the same manner as in Example 1, except for replacing boron with germanium in the amount shown in Table 1. The shift of the position of the XRD peak of the negative electrode active material which corresponds to the XRD peak assigned to the (422) plane of silicon from the position of the latter peak is shown in Table 1. The lattice strain of the solid solution as calculated by the Hall method is also shown in Table 1. In Table 1, a positive value representing the amount of the shift of an XRD peak position means a shift to the larger angle side, while a negative value means a shift to the smaller angle side.

als obtained in Examples 1 to 3 and Comparative Examples 1 to 3. The negative electrode active material, an electroconductive material, and a binder were mixed in a mixing ratio of 60:30:10 (wt %), and the mixture was suspended in N-methylpyrrolidone to obtain a negative electrode mixture. Acetylene black was used as the electroconductive material, and polyvinylidene fluoride was used as the binder. The resulting negative electrode mixture was applied to an 18 μm thick electrolytic copper foil, dried, and roll-pressed to form a negative electrode active material layer.

A disk having a diameter of 14 mm was punched out from the negative electrode and dried in vacuo at 160° C. for 6 hours. A size 2032 coin cell was assembled in an argon atmosphere in a glove box using the resulting negative electrode, metallic lithium as a counter electrode, and, as an electrolyte, a 1 mol/L solution of $LiPF_6$ in a 1:1 (by volume) mixed solvent of ethylene carbonate and diethyl carbonate. Polypropylene porous film was used as a separator.

Figure 5A:
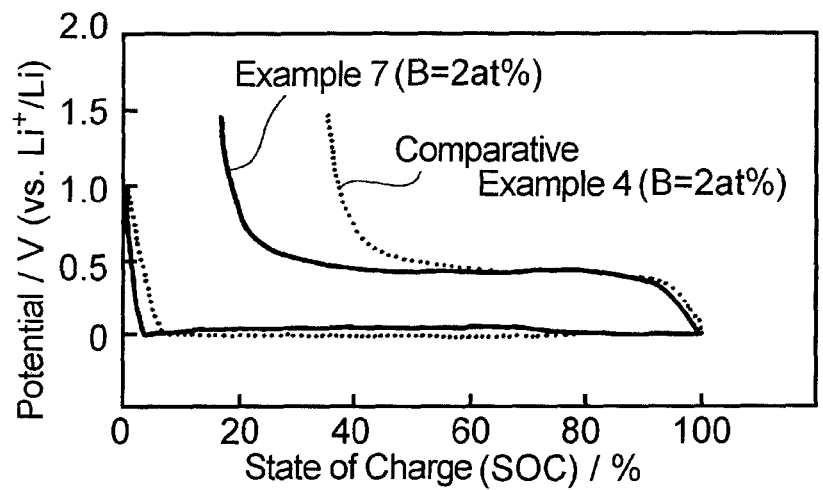
FIG. 5(a), FIG. 5(b), and FIG. 5(c) show the initial charge/discharge curves of coin cells made by using the negative electrode obtained in Examples 7 to 9 and Comparative Examples 4 to 6.
Figure 5B:
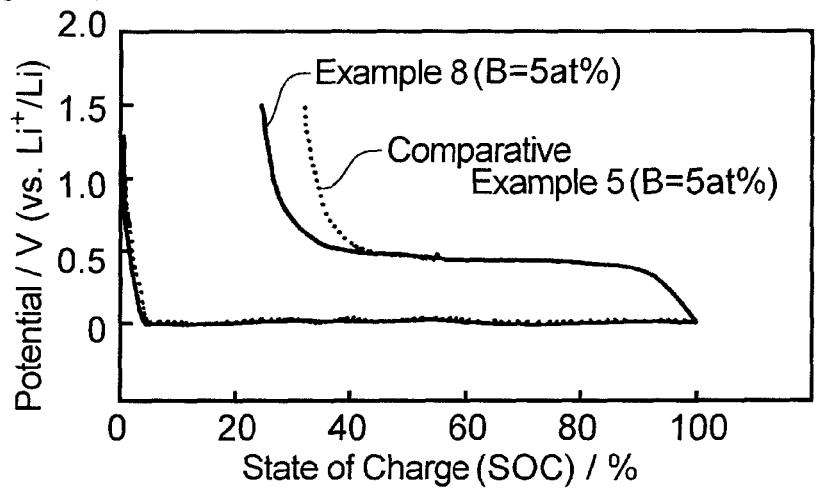
Figure 5C:
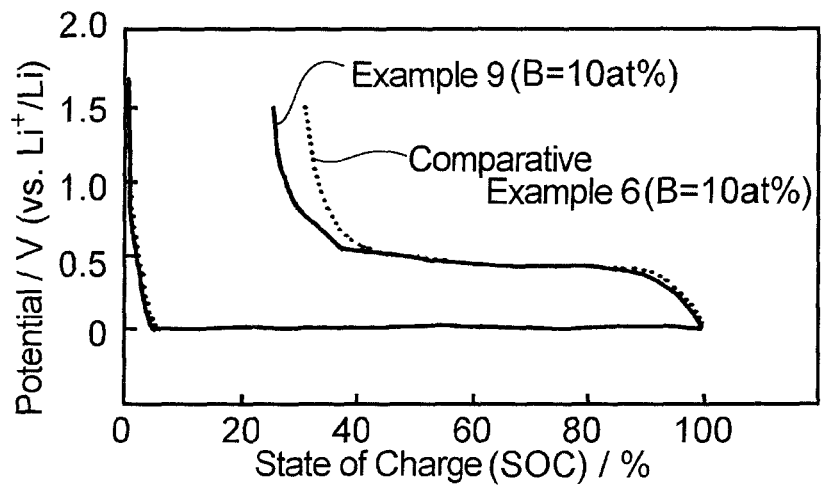
Figure 6A:
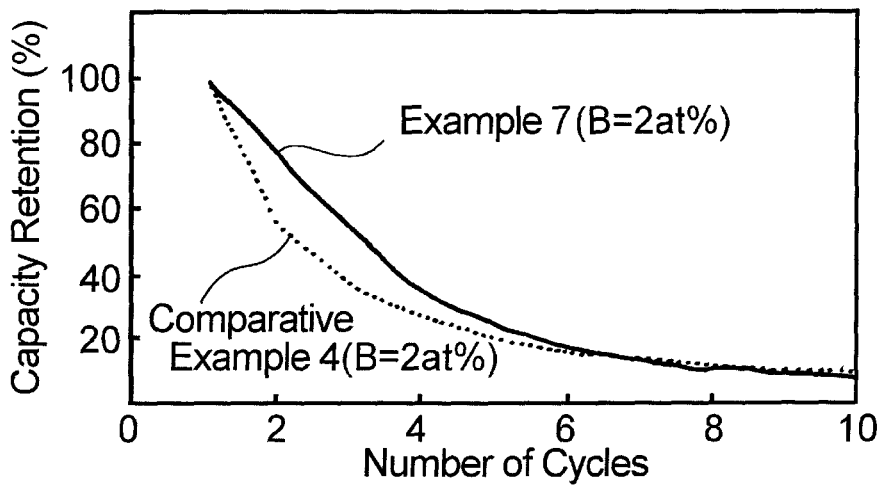
FIG. 6(a), FIG. 6(b), and FIG. 6(c) show the charge/discharge cycle characteristics of coin cells made by using the negative electrode obtained in Examples 7 to 9 and Comparative Examples 4 to 6.
Figure 6B:
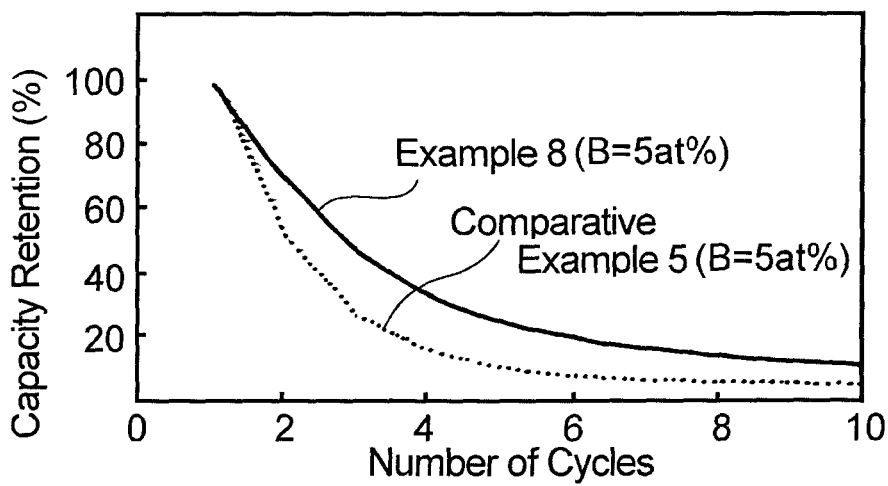
Figure 6C:
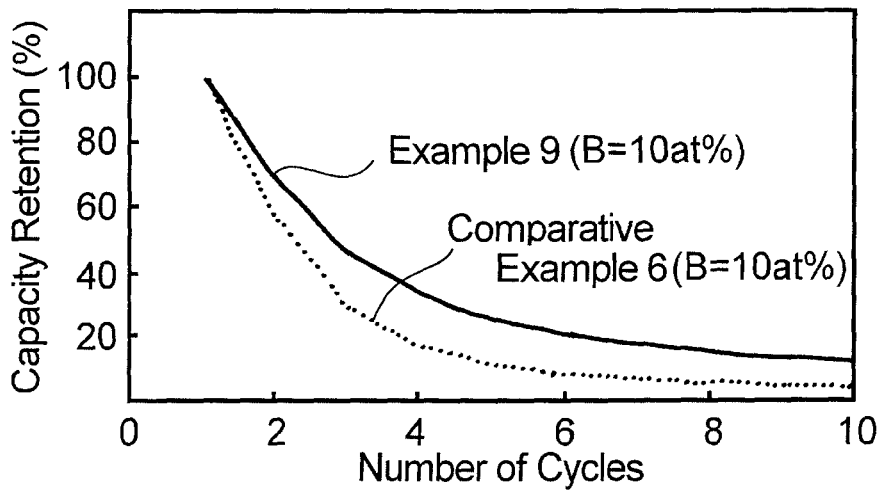

The resulting coin cell was evaluated for reversibility in the initial charge/discharge and charge/discharge cycle characteristics under the following conditions. The results on reversibility are shown in FIGS. 5(a), 5(b), and 5(c), and the results on cycle characteristics are shown in FIGS. 6(a) through 6(c). In the evaluation, the cell was charged in a constant current-constant voltage (hereinafter "CC-CV") mode first at a current rate of 0.1 C up to a voltage of 0.010 V and then at that voltage until the current reduced to 0.1 C/5. The cell was discharged in a CC mode at a constant current rate of 0.1 C to a voltage of 1.5 V. The charge/discharge cycle characteristics were expressed in terms of percentage of the capacity in each cycle to the initial capacity, i.e., capacity retention percentage.

As is apparent from the results in FIGS. 5(a) to 5(c), the coin cells having the negative electrodes of Examples exhibit higher reversibility in the initial charge/discharge cycle than those having the comparative negative electrodes. That is, the reversibility is lowered in Comparative Examples where the silicon solid solution having lost the lattice strain is used. It is seen from the results of Examples 7 to 9 that the reversibility increases with a reduction of boron content in the solid solution.

TABLE 1

| | Boron (Solute) Content (at % with respect to Si) | Germanium (Solute) Content (at % with respect to Si) | Iron Content (at % with respect to Si) | Particle Size $D_{50}$ (μm) | Shift from (422) Plane Peak of Si (°, CuKα1) | Lattice Strain (%) |
|---|---|---|---|---|---|---|
| Example 1 | 2 | 0 | 0 | 2.6 | 0.49 | 0.43 |
| Example 2 | 5 | 0 | 0 | 2.6 | 0.68 | 0.57 |
| Example 3 | 10 | 0 | 0 | 2.7 | 0.69 | 0.71 |
| Example 4 | 5 | 0 | 1.5 | 2.6 | 0.67 | 0.49 |
| Example 5 | 0 | 6 | 0 | 2.8 | −0.21 | 0.25 |
| Example 6 | 0 | 10 | 0 | 2.6 | −0.30 | 0.32 |
| Comp. Example 1 | 2 | 0 | 0 | 2.6 | 0.05 | 0.16 |
| Comp. Example 2 | 5 | 0 | 0 | 2.6 | 0.06 | 0.12 |
| Comp. Example 3 | 10 | 0 | 0 | 2.7 | 0.08 | 0.27 |

Examples 7 to 9 and Comparative Examples 4 to 6

Negative electrodes of Examples 7 to 9 and Comparative Examples 4 to 6 were prepared in accordance with the following procedure using the negative electrode active materi- As is clear from the results in FIGS. 6(a) to 6(c), the coin cells having the negative electrodes of Examples have higher capacity retention in charge/discharge cycles than those having the comparative negative electrodes, proving to have good cycle characteristics. The coin cells of Comparative Examples using the silicon solid solutions with a reduce lattice strain exhibit reduced cycle characteristics.

Examples 10 and 11 and Comparative Example 7

A negative electrode was made in accordance with the method disclosed in WO 08/001,540 as follows. A current collector formed of 18 μm thick electrolytic copper foil was cleaned with an acid cleaning solution at room temperature for 30 seconds and then washed with pure water for 15 seconds. A slurry containing the negative electrode active material prepared in Example 1 was applied to both sides of the current collector to a thickness of 15 μm to form a coating layer. The composition of the slurry was negative electrode active material:styrene-butadiene rubber (binder):acetylene black=100:1.7:2 by weight.

The current collector having the coating layers was immersed in a copper pyrophosphate bath having the following composition, and the coating layers were plated with copper by electrolysis under the following electrolysis conditions to form an active material layer on each side. A DSE was used as an anode, and a direct current power source was used. The electroplating was stopped at the time when copper was deposited throughout the thickness of each coating layer. An active material layer was thus formed to provide a negative electrode of Example 10. The $P_2O_7$ to Cu weight ratio, $P_2O_7$/Cu, of the copper pyrophosphate bath was 7.

Copper pyrophosphate trihydrate: 105 g/l
Potassium pyrophosphate: 450 g/l
Potassium nitrate: 30 g/l
Bath temperature: 50° C.
Current density: 3 A/dm$^2$
pH: adjusted to 8.2 by the addition of aqueous ammonia and polyphosphoric acid.

A negative electrode of Example 11 was obtained in the same manner as in Example 10, except for replacing the negative electrode active material obtained in Example 1 with that obtained in Example 2. A negative electrode of Comparative Example 7 was obtained in the same manner as in Example 10, except for replacing the negative electrode active material obtained in Example 1 with particulate pure silicon (negative electrode active material) having a $D_{50}$ of 2 μm.

Figure 7:
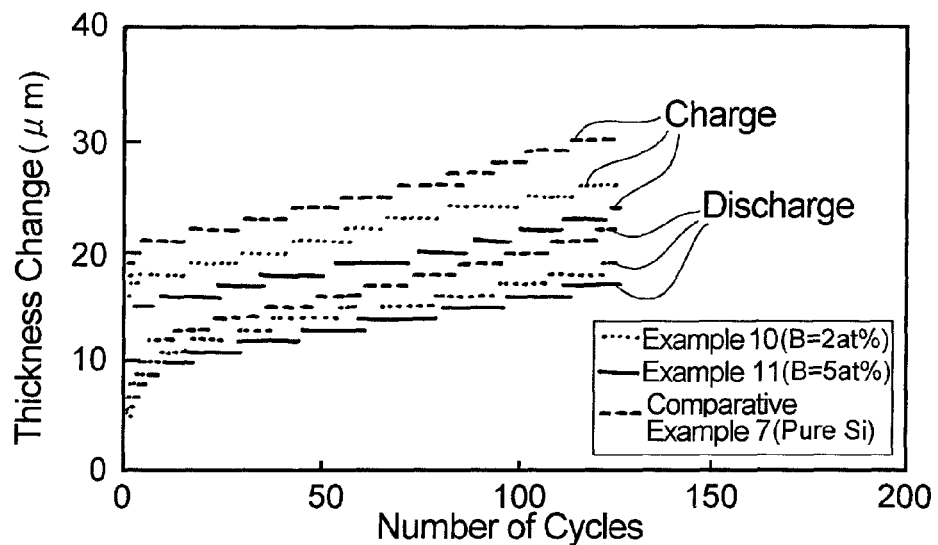
FIG. 7 graphically represents the relation between the number of charge/discharge cycles and the thickness of the laminate cell made by using each of the negative electrodes obtained in Examples 10 and 11 and Comparative Example 7.

A lithium secondary battery was assembled using each of the resulting negative electrodes as follows and repeatedly charged and discharged to evaluate for expansion of the battery. $LiNi_{1/3}Mn_{1/3}CO_{1/3}O_2$ having 20 wt % $Li_{1.05}Ni_{0.7}Ti_{0.2}(Mn_{2/3}Li_{1/3})_{0.1}O_2$ added thereto was used as a positive electrode active material. The positive electrode active material was suspended in N-methylpyrrolidone as a solvent together with acetylene black and polyvinylidene fluoride to prepare a positive electrode mixture. The mixing ratio of the positive electrode active material, acetylene black, and polyvinylidene fluoride was 88:6:6 by weight. The positive electrode mixture was applied using an applicator to a current collector formed of 20 μm thick aluminum foil, dried at 120° C., and roll-pressed under a load of 0.5 ton/cm to make a positive electrode. A 1 mol/L solution of $LiPF_6$ in a 1:1 (by volume) mixed solvent of ethylene carbonate and diethyl carbonate was used as an electrolyte. Polypropylene porous film was used as a separator. The laminate cell assembled using these members (electrode size: negative electrode, 42 mm×31 mm; positive electrode, 40 mm×29 mm) was subjected to charge/discharge cycles under the following conditions, and a change in cell thickness was measured. The results obtained are shown in FIG. 7. The charging was carried out in a CC-CV mode up to a voltage of 4.2 V. The charge was completed at the time when the current rate reduced to C/5. The discharge was carried out in a CC mode to a voltage of 2.7 V. The charge and discharge rate was 0.05 C in the first cycle, 0.1 C in the second to fifth cycles, and 0.5 C in the sixth and subsequent cycles. The thickness of the laminate cell was measured by a micrometer at the center position of the surface that has the largest width.

The results in FIG. 7 clearly prove that the batteries of Examples 10 and 11 show smaller changes in thickness caused by charge/discharge cycles than the battery of Comparative Example 7.

Example 12

Figure 8:
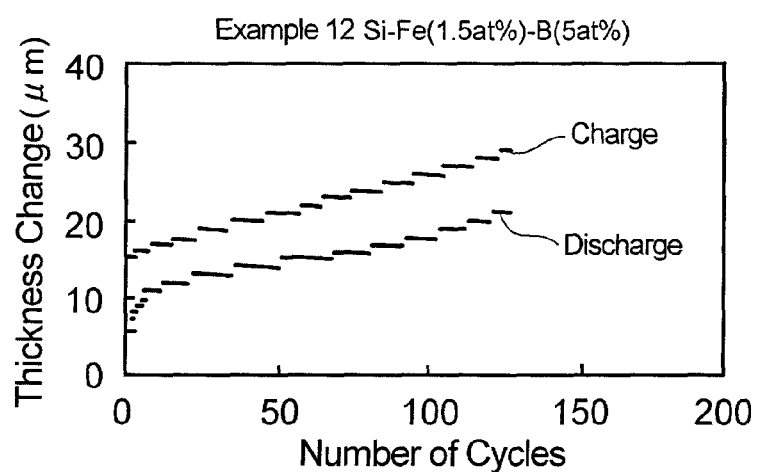
FIG. 8 graphically represents the relation between the number of charge/discharge cycles and the thickness of the laminate cell made by using the negative electrode obtained in Example 12.

A negative electrode was obtained in the same manner as in Example 10, except for replacing the negative electrode active material prepared in Example 1 with the negative electrode active material prepared in Example 4 (Si—Fe(1.5 at %)-B(5 at %)). A lithium secondary battery was assembled using the resulting negative electrode in the same manner as in Example 10. The battery was evaluated in the same manner as in Example 10. The results are shown in FIG. 8. It is seen from FIG. 8 that the battery of this Example shows reduced changes in thickness due to charge/discharge cycles similarly to those of Examples 10 and 11. Comparison between Examples 10 and 11 and Example 12 reveals that the Si—B solid solution is more effective in reducing the change in cell thickness due to charge/discharge cycles and therefore more favorable than the Si—B solid solution containing an Si—Fe alloy.

Examples 13 and 14 and Comparative Example 8

A lithium secondary battery was assembled using each of the negative electrodes of Examples 11 and 12 and Comparative Example 7 and evaluated for charge/discharge rate characteristics. The secondary battery was made in accordance with the following procedure. The same positive electrode, electrolyte, and separator as used in Examples 11 and 12 were used here, except for using $LiMn_{1/3}Co_{1/3}Ni_{1/3}O_2$ as a positive electrode active material. The resulting coin cells (electrode diameter: 14 mm) were charged and discharged 3 cycles at a rate of 0.1 C, 3 cycles at a rate of 0.5 C, and 3 cycles at a rate of 1.0 C, respectively. The capacities in the charge/discharge cycle at 0.5 C and 1.0 C were expressed in percentage to the capacity in the charge/discharge cycle at 0.1 C (capacity retention). The results obtained are shown in Table 2. The charge and discharge were carried out under the following conditions. The first charge was conducted in a CC-CV mode at a current rate of 0.05 C up to 4.2 V. When the current reduced to C/5, the charge was stopped. The first discharge was effected at a current rate of 0.05 C to a voltage of 2.7 V. The second to fourth charge/discharge cycles were conducted under the same conditions as the first cycle, except that the charge/discharge rate was 0.1 C. The fifth to seventh charge/discharge cycles were conducted under the same conditions as the first cycle, except that the charge/discharge rate was 0.5 C. The eighth to tenth charge/discharge cycles were performed under the same conditions as the first cycle, except that the charge/discharge rate was 1 C. The eleventh and subsequent charge/discharge cycles were carried out under the same conditions as the first cycle, except that the charge/discharge rate was 0.5 C.

It is proved from the results in Table 2 that the batteries of Examples 13 and 14 retain higher capacities even after repetition of charge/discharge cycles at a high rate than the battery of Comparative Example 8. It is seen by comparing Examples 13 and 14 that the Si—B solid solution exhibits better rate characteristics and therefore more favorable than the Si—B solid solution containing an Si—Fe alloy.

Examples 15 and 16

A lithium secondary battery was obtained in the same manner as in Example 13, except for using the negative electrode material prepared in Example 5 (Example 15) or Example 6 (Example 16) and evaluated for charge/discharge rate characteristics. The results are shown in Table 2 below.

TABLE 2

| | Negative Electrode Active Material | 0.1 C | 0.5 C | 1.0 C |
|---|---|---|---|---|
| Example 13 | Si—B(5 at %) | 100% | 95% | 87% |
| Example 14 | Si—Fe(1.5 at %)—B(5 at %) | 100% | 94% | 84% |
| Example 15 | Si—Ge(6 at %) | 100% | 93% | 84% |
| Example 16 | Si—Ge(10 at %) | 100% | 95% | 88% |
| Comp. Example 8 | pure Si | 100% | 92% | 81% |

The results in Table 2 show that the batteries of Examples 15 and 16 retain high capacities after repeated charge/discharge cycling at a high rate.

Example 17 and Comparative Example 9

In this Example, the particulate active material prepared in Example 1 (silicon solid solution containing 2 at % boron) was evaluated for oxidation resistance in high temperature as follows. The particulate active material weighing 2 g was mixed with 5 ml of a nonaqueous electrolyte, and the mixture was sealed in an aluminum-laminated container. The operation was all done in an argon atmosphere. The nonaqueous electrolyte was a 1 mol/L solution of $LiPF_6$ in a 1:1 (by volume) mixed solvent of ethylene carbonate and diethyl carbonate. After the container was left to stand at 45° C. for 3 days, it was opened in an argon atmosphere, and the particulate active material was analyzed by elemental analysis to determine the oxygen content using an oxygen/nitrogen analyzer, EMGA-620W by Horiba, Ltd. In Comparative Example 9, pure silicon as a particulate active material ($D_{50}$=2 μm) was similarly analyzed. As a result, the oxygen concentration in Example 17 was 2200 ppm, whereas that in Comparative Example 9 was 4000 ppm, proving that the negative electrode active material of the invention is highly resistant to oxygen in high temperature.

Examples 18 to 21 and Comparative Example 10

Figure 9A:
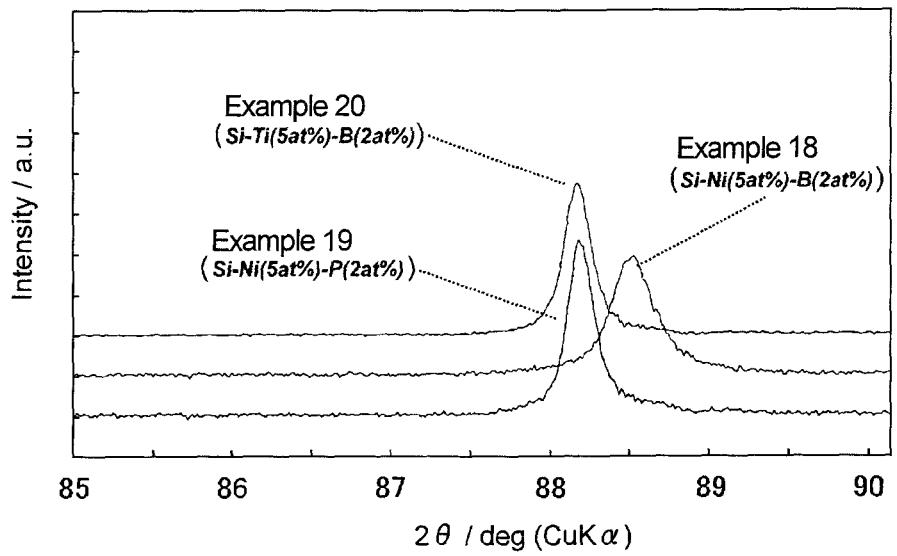
FIG. 9(a) is an XRD pattern of the negative electrode active materials obtained in Examples 18 to 20.
Figure 9B:
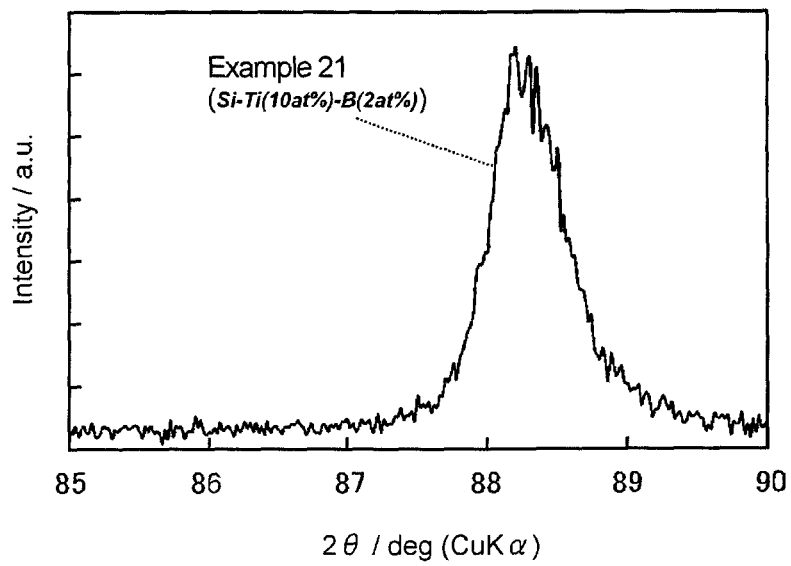
FIG. 9(b) is an XRD pattern of the negative electrode active material obtained in Example 21.

In these Examples, lithium secondary battery containing each of the negative electrode active materials shown in Table 3 below was evaluated for reversibility in the initial charge. These active materials were prepared in the same manner as in Example 1. An XRD pattern of each negative electrode active material is shown in FIGS. 9(a) and 9(b). In Comparative Example 10 particulate pure silicon ($D_{50}$=2 μm) was used as a negative electrode active material.

TABLE 3

| | Solute Element Content (at %, with respect to Si) | Alloying Element Content (at %, with respect to Si) | Particle Size $D_{50}$ (μm) | Shift from Si (422) Peak (°, CuKα1) | Lattice Strain (%) |
|---|---|---|---|---|---|
| Example 18 | B = 2 | Ni = 5 | 2.6 | 0.55 | 0.41 |
| Example 19 | P = 2 | Ni = 5 | 2.6 | 0.19 | 0.24 |
| Example 20 | B = 2 | Ti = 5 | 2.6 | 0.17 | 0.22 |
| Example 21 | B = 2 | Ti = 10 | 2.6 | 0.23 | 0.27 |
| Comp. Example 10 | 0 | 0 | 2.5 | 0.06 | 0.06 |

Each negative electrode active material, an electroconductive material, and a binder were mixed in a mixing ratio of 93:2:5 by weight percent, and the mixture was suspended in N-methylpyrrolidone to prepare a negative electrode mixture. Acetylene black was used as the electroconductive material, and polyamideimide was used as the binder. The negative electrode mixture was applied onto a 18 μm thick electrolytic copper foil to a thickness of 10 μm and dried to form a negative electrode active material layer. A disk having a diameter of 14 mm was punched out from the resulting negative electrode and dried in vacuo at 160° C. for 6 hours. A size 2032 coin cell was assembled in an argon atmosphere in a glove box using the negative electrode, metallic lithium as a counter electrode, and, as an electrolyte, a 1 mol/L solution of $LiPF_6$ in a 1:1 (by volume) mixed solvent of ethylene carbonate and diethyl carbonate. Polypropylene porous film was used as a separator. The resulting coin cell was evaluated for reversibility in the initial charge/discharge. The results are shown in FIG. 10.

Figure 10:
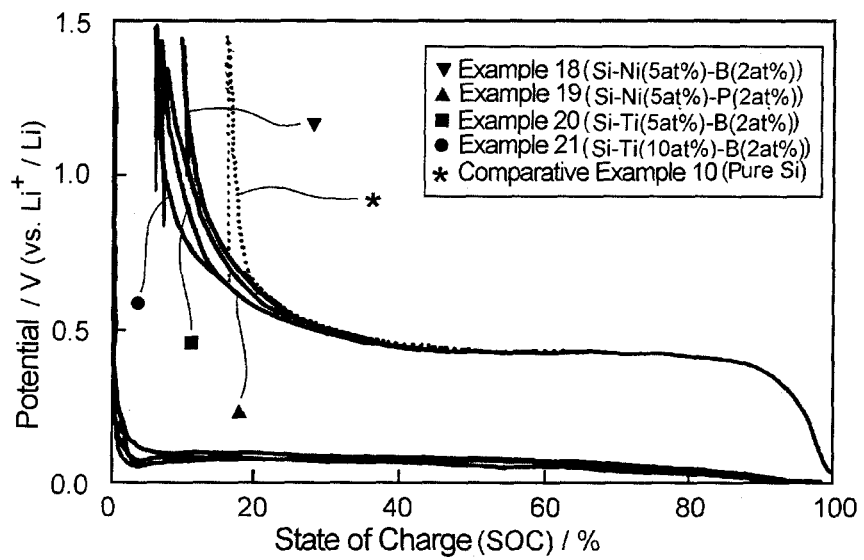
FIG. 10 shows the initial charge/discharge curve of the coin cells made by using the negative electrodes obtained in Examples 18 to 21 and Comparative Example 10.

As is apparent from the results in FIG. 10, the coin cells having the negative electrode of the invention have higher reversibility in the initial charge/discharge than the coin cell having the comparative negative electrode.

Examples 23 and 24 and Comparative Example 11

In these Examples, lithium secondary batteries were evaluated for charge/discharge cycle characteristics as follows. The Si—Ge(6 at % with respect to Si atom) solid solution of Example 5 and the Si—Ni-(5 at %)-P(2 at %) solid solution of Example 19 were used in Examples 23 and 24, respectively, as a negative electrode active material. Coin cells were made using these negative electrode active materials in the same manner as in Example 18. In the evaluation, the cell was charged in a CC-CV mode first at a current rate of 0.1 C up to 0.010 V and then at that voltage until the current reduced to C/5. The cell was discharged in a CC mode at a rate of 0.1 C to a voltage of 1.5 V. The charge/discharge cycle characteristics were expressed in terms of percentage of the capacity in the 20th cycle to the initial capacity, i.e., capacity retention. The results obtained are shown in Table 4, in which the results of a coin cell having pure silicon as a negative electrode active material (Comparative Example 11) are also shown.

TABLE 4

| | Negative Electrode Active Material | Capacity Retention in the 20th Cycle (%) |
|---|---|---|
| Example 23 | Si—Ge(6 at %) | 89 |
| Example 24 | Si—Ni(5 at %)—P(2 at %) | 86 |
| Comp. Example 11 | pure Si | 84 |

As is apparent from the results in Table 4, the coin cell using the negative electrode active material of Example exhibits higher capacity retention and better cycle characteristics than that using the comparative negative electrode active material.

Example 25

In this Example, a lithium secondary battery was evaluated for temperature dependence of cycle characteristics as follows. As a negative electrode active material, an Si—B (2 at % with respect to Si atom) solid solution, which is the same as the active material prepared in Example 1, was used. A negative electrode was prepared using this negative electrode active material in the same manner as in Example 10, except that the slurry containing the negative electrode active material was applied to the current collector to a thickness of 10 μm. A lithium secondary battery was assembled using the resulting negative electrode as follows and repeatedly charged and discharged to evaluate for expansion of the battery. $LiMn_2O_2$ having 20 wt % $Li_{1.03}Mn_{0.07}Ni_{0.65}Ti_{0.25}O_2$ added thereto was used as a positive electrode active material. The positive electrode active material was suspended in N-methylpyrrolidone as a solvent together with acetylene black and polyvinylidene fluoride to prepare a positive electrode mixture. The mixing ratio of the positive electrode active material, acetylene black, and polyvinylidene fluoride was 88:6:6 by weight. The positive electrode mixture was applied using an applicator to a current collector formed of 20 μm thick aluminum foil, dried at 120° C., and roll-pressed under a load of 0.5 ton/cm to make a positive electrode. A laminate cell was made otherwise in the same manner as in Example 10. For comparison, a laminate cell was made in the same manner as described, except for using pure silicon as a negative electrode active material and applying the slurry containing the negative electrode active material to the current collector to a thickness of 20 μm. The resulting laminate cells were subjected to charge/discharge cycling test in the same manner as in Example 10 to determine the discharge capacity. The charge/discharge cycles were carried out at high temperature (45° C.) and room temperature (20° C.). The cycle characteristics determined at 45° C. are shown in FIG. 11.

Figure 11:
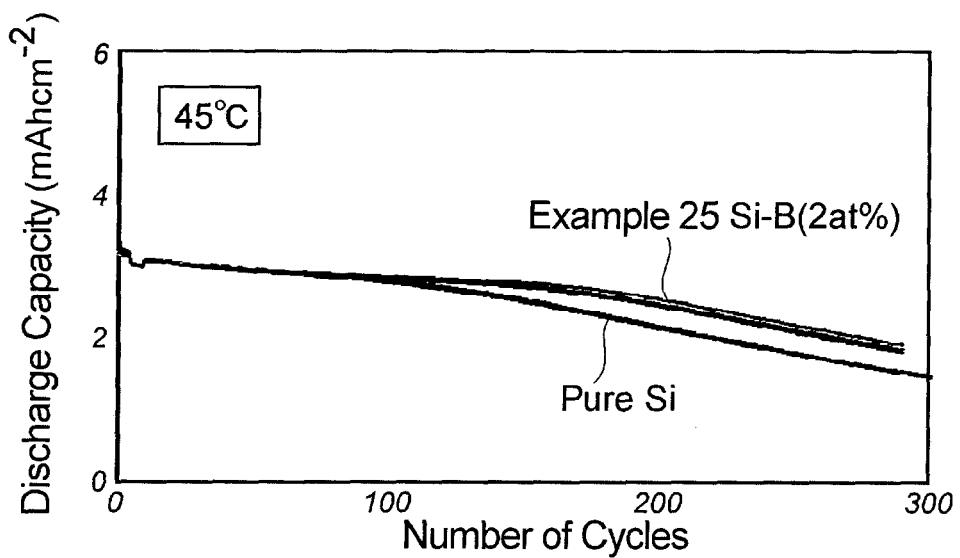
FIG. 11 is a graph representing the cycle characteristics at 45° C. of the laminate cell made by using the negative electrode obtained in Example 25.

The results in FIG. 11 clearly prove that the laminate cell having the negative electrode active material of Example shows better cycle characteristics than that having the comparative negative electrode active material. The cycle characteristics determined at 45° C. were compared with those determined at 25° C. (not shown). As a result, the laminate cell having the comparative negative electrode active material undergoes a considerable reduction in cycle characteristics when tested at 45° C. compared with the results obtained at 25° C. Although the laminate cell having the negative electrode active material of Example also showed a reduction in cycle characteristics at 45° C. compared with the results at 25° C., the extent of the reduction in cycle characteristics was smaller than in Comparative Example.

Example 26

Figure 12:
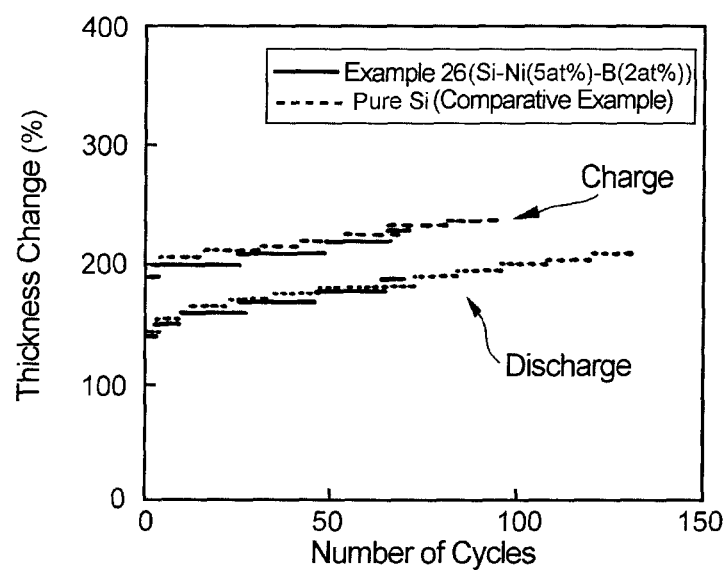
FIG. 12 is a graph representing the thickness change of the laminate cell prepared by using the negative electrode obtained in Example 26 caused by charge/discharge cycling.

In this Example, a lithium secondary battery was evaluated for change in thickness due to charge/discharge cycling. An Si—Ni (5 at %)-B (2 at %) solid solution, which is the same active material as prepared in Example 1, was used as a negative electrode active material. A negative electrode was prepared using this negative electrode active material in the same manner as in Example 10, except that the slurry containing the negative electrode active material was applied to the current collector to a thickness of 10 μm. A laminate cell was assembled using the resulting negative electrode and repeatedly charged and discharged to evaluate for expansion of the cell. The laminate cell was made in the same manner as in Example 25. For comparison, a laminate cell was made in the same manner as described above, except for using pure silicon as a negative electrode active material and applying the slurry containing the negative electrode active material to the current collector to a thickness of 20 μm. The resulting laminate cells were subjected to charge/discharge cycling test in the same manner as in Example 10, and the thickness of the negative electrode active material layer was measured. The results obtained are shown in FIG. 12. In FIG. 12, the ordinate represents a value obtained by subtracting the thickness of the negative electrode active material layer before charge/discharge from that after the charge/discharge, dividing the difference by the thickness of the negative electrode active material layer before charge/discharge, and multiplying the quotient by 100. As is apparent from the results in FIG. 12, the battery of Example undergoes reduced change in thickness due to charge/discharge cycling than the battery of Comparative Example.

REFERENCE SIGNS LIST

1: Silicon solid solution/silicon alloy composite
2: Silicon solid solution matrix
3: Silicon alloy phase

The invention claimed is:
1. A negative electrode active material for nonaqueous secondary batteries, comprising a silicon solid solution which contains silicon and one or more than one of a group 3 semimetal or metal element, a group 4 semimetal or metal element except silicon, or a group 5 nonmetal or semimetal element,
the solid solution showing an XRD pattern in which the position of the XRD peak of the solid solution corresponding to the XRD peak assigned to the (422) plane of silicon shifts to the smaller or greater angle side relative to the position of the XRD peak assigned to the (422) plane of silicon by 0.1° to 1° and having a lattice strain of 0.01% to 1% as determined by XRD.
2. The negative electrode active material for nonaqueous secondary batteries according to claim 1, wherein the position of the XRD peak of the solid solution corresponding to the XRD peak assigned to the (422) plane of silicon shifts to the greater angle side relative to the position of the XRD peak assigned to the (422) plane of silicon by 0.1° to 1°.
3. The negative electrode active material for nonaqueous secondary batteries according to claim 1, wherein the solid solution further contains a silicon alloy, and the silicon alloy is precipitated over a matrix of the solid solution.
4. The negative electrode active material for nonaqueous secondary batteries according to claim 3, wherein the silicon alloy comprises silicon and metal M, metal M is selected in such a manner that, at the eutectic point of the silicon alloy, metal M has a ratio that satisfies from 1 to 50 at % in the composition of the silicon alloy, the ratio is defined by [the number of metal M atoms/(the number of Si atoms+the number of metal M atoms)×100].
5. The negative electrode active material for nonaqueous secondary batteries according to claim 4, wherein the silicon alloy is a silicon-iron alloy, a silicon-nickel alloy, or a silicon-titanium alloy.
6. A negative electrode for nonaqueous secondary batteries comprising the negative electrode active material according to claim 1.

7. A nonaqueous secondary battery comprising the negative electrode according to claim 6.

8. A silicon compound comprising a silicon solid solution which contains silicon and one or more than one of a group 3 semimetal or metal element, a group 4 semimetal or metal element except silicon, or a group 5 nonmetal or semimetal element, the solid solution showing an XRD pattern in which the position of the XRD peak of the solid solution corresponding to the XRD peak assigned to the (422) plane of silicon shifts to the smaller or greater angle side relative to the position of the XRD peak assigned to the (422) plane of silicon by 0.1° to 1° and having a lattice strain of 0.01% to 1% as determined by XRD.

9. The negative electrode active material for nonaqueous secondary batteries according to claim 2, wherein the solid solution further contains a silicon alloy, and the silicon alloy is precipitated over a matrix of the solid solution.

10. A negative electrode for nonaqueous secondary batteries comprising the negative electrode active material according to claim 2.

11. A negative electrode for nonaqueous secondary batteries comprising the negative electrode active material according to claim 3.

12. A negative electrode for nonaqueous secondary batteries comprising the negative electrode active material according to claim 4.

13. A negative electrode for nonaqueous secondary batteries comprising the negative electrode active material according to claim 5.

* * * * *